United States Patent [19]
Kohnke

[11] 3,741,506
[45] June 26, 1973

[54] PARACHUTE CANOPY
[76] Inventor: Richard Kohnke, Heinrich-Stoess-Strasse 31, Ziegelhausen bei Heidelberg, Germany
[22] Filed: Feb. 25, 1971
[21] Appl. No.: 118,950

Related U.S. Application Data
[63] Continuation of Ser. No. 869,997, , which is a continuation-in-part of Ser. No. 700,772, Jan. 26, 1968, abandoned.

[30] Foreign Application Priority Data
Jan. 27, 1967 Germany.................. P 15 06 051.2

[52] U.S. Cl. ............................................... 244/145
[51] Int. Cl. .......................................... B64d 17/02
[58] Field of Search ......................... 244/145, 142; 46/86 R

[56] References Cited
UNITED STATES PATENTS
2,337,192 12/1943 Hastings............................ 244/145
2,384,187 9/1945 Manson et al. ...................... 244/145
3,331,573 7/1967 Winker et al. ...................... 244/145
2,509,182 5/1950 Annable............................. 46/86 R
3,513,591 5/1970 Hansen ............................. 46/86 R FOREIGN PATENTS OR APPLICATIONS
1,102,665 2/1968 Great Britain..................... 244/145

Primary Examiner—Milton Buchler
Assistant Examiner—Jesus D. Sotelo
Attorney—Francis D. Stephens and Hugo Huettig, Jr.

[57] ABSTRACT

A parachute canopy, especially a cargo parachute, is made of one-piece gores composed of unwoven bonded fibrous textile material, such as spunbond. The canopy is inexpensive and disposable.

2 Claims, 6 Drawing Figures

INVENTOR
Richard Kohnke

BY Stephens, Huettig and O'Connell
ATTORNEYS

INVENTOR

Richard Kohnke

BY Stephens, Huettig and O'Connell
ATTORNEYS

PARACHUTE CANOPY

This is a continuation of application Ser. No. 869,997, which was a continuation-in-part of application Ser. No. 700,772, filed Jan. 26, 1968 and now abandoned.

This invention is a parachute canopy, mainly for use in cargo parachutes. The object of this invention is to produce a remarkable saving in cost as well as a simplification of manufacturing methods of such parachute canopies.

Canopies for personnel- and cargo-type parachutes have previously been constructed of different materials, such as cotton, silk, rayon, perlon and nylon. These materials are available in widths not exceeding 1 m. Depending on the strength and elongation of these materials, canopy gores are subdivided into sections. According to the intended rating and purpose of the parachute, sections are straight or bias cut and then sewn together with overlapping seams by means of two rows of stitching, normally 10mm wide. The single gores are then joined with vertical overlapping seams, with the two rows of stitching either 10, 20 or 35 mm wide.

Synthetic materials, such as perlon, nylon or similar, are easily affected by friction burns, caused by the canopy coming in direct contact with bodies or objects during inflation, and on account of suspension line overlaps. Synthetic materials have been utilized in the manufacture of parachute canopies since natural silk and rayon have become rare and difficult to obtain in sufficient quantities.

Due to the small width of these materials, canopy gores must be divided into sections, causing a great effort in cutting and sewing. Subdivision of canopy gores was also found necessary in order to obtain the required strength. Conventional materials must be manufactured in accordance with existing standards for parachute cloth and are therefore relatively expensive. In addition to the high cost of materials, the rather extensive manufacturing requirements must be considered.

With the increasing demand for cargo parachutes, the cost factor in the manufacture of canopies and complete units has gained more and more significance. This question becomes even more important considering the mostly one-time utilization of cargo parachutes. Efforts have been made to manufacture efficient parachutes using other materials, such as paper or rayon. However, experimental data have not met the required results.

On the outlook for a new and convenient material for the manufacture of parachute canopies showing the required strength and elongation and allowing a reduction of cost, it was found that an unwoven and bonded fibrous textile such as a compressed fiber fleece material is adaptable for parachute manufacture, even though its strength and elongation do not conform with existing standards and test requirements. The unwoven or nonwoven material used in this invention is described in the following publications: C. M. Brandt, published by Nonwoven Associates, Cambridge 39, Massachusetts, 1959, U.S. Library of Congress, Catalog Card Number 59-13, 229; and F. M. Buresh, Nonwoven Fabrics, published by the Reinhold Publishing Corporation, New York, N. Y., U.S. Library of Congress, Catalog Card Number 62-21831. Such nonwoven materials are generically described as spun bonded products and so designated in British Pat. No. 1,126,560. Materials of this type are manufactured and sold by Carl Freundenberg, Weinheim, Germany, under the trademark "SPINBOND" which is the subject of German Trademark Registration Number 846,812 of May 13, 1967, and of U.S. Trademark application Ser. No. 375,424, filed Nov. 6,1970, for registration of the mark as applied to "Non Woven Finished and Semi Finished Fabrics," which mark was published for opposition in the Feb. 15, 1972, issue of the Official Gazette and registered Sept. 12, 1972, as registration number 942,853.

Up to the present, it was believed that a material used in the manufacture of parachute canopies must show an excessive strength at limited elongation. Fiber fleece material however shows a relatively low strength and extensive elongation. It has since been proved that increased elongation is not a disadvantage when, in due relation to low strength, a compatible material is provided. From this fundamental knowledge, this invention uses thinly rolled-out bonded lightweight fiber fleece for the manufacture of parachute canopies. The material allows conventional canopy construction at a lower cost.

Another advantage is found in the fact that fiber fleece material may be produced in considerably larger widths than other conventional parachute cloths, thus allowing the construction of canopies using one-piece gores without subdivision. There first existed objections against the manufacture of canopies with non-divided gores with regard to sufficient strength. However, it has also been proved that low strength in connection with extended elongation make a useful material of adequate strength and safety for the construction of parachute canopies with non-divided gores.

Another reason is found in the fact that fleece material shows equal elongation in all directions, whereas conventional parachute cloths show considerable deviation of elongation in warp and filling threads. In the construction of parachute canopies with non-divided gores, the high elastic elongation of the fleece material has its full effect. The manufacture of canopies with non-divided gores allows also a considerable reduction in manufacturing cost and savings in cutting and sewing the various sections. The construction of parachute canopies with non-divided gores, without the normally necessary cutting and joining of sections to make up a gore, is also of significance for other usable materials aside from fleece material.

The means by which the objects of this invention are obtained are described more fully with reference to the accompanying drawings in which.

Figure 1:
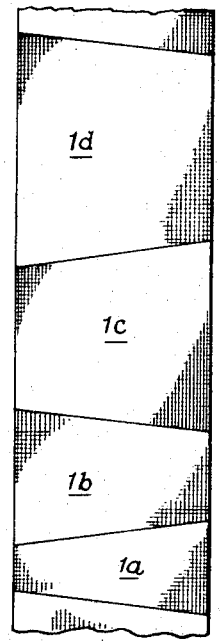
FIG. 1 is a plan view of a sheet of material showing gore pieces being cut according to the prior art.
Figure 2:
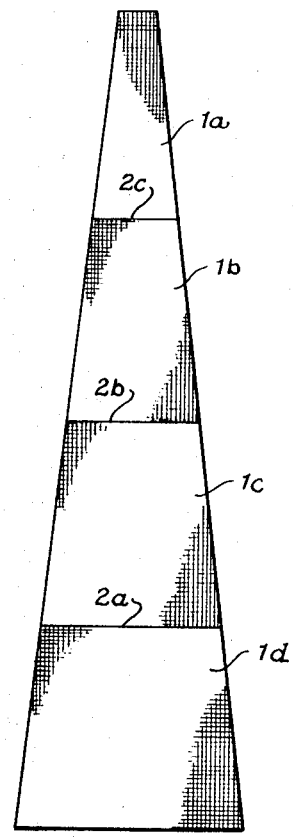
FIG. 2 is a plan view of a gore assembled from the pieces of FIG. 1.

In block constructions according to FIGS. 1 and 2 using conventional fabrics in widths up to maximum 1 m, the individual pieces 1a through 1d are cut in such a manner that the seams 2a through 2c of the finished gore in FIG. 2 run at right angles to the center line of the gore and parallel to each other.

Figure 3:
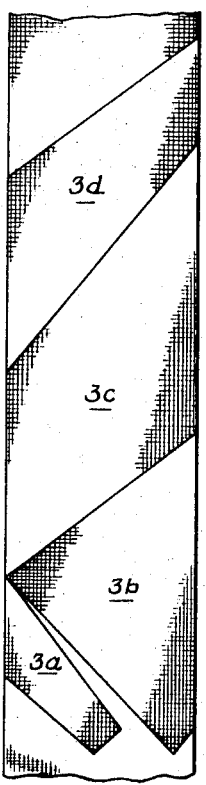
FIG. 3 is a view similar to FIG. 1 showing the sheet of material cut on a bias to form gore pieces.
Figure 4:
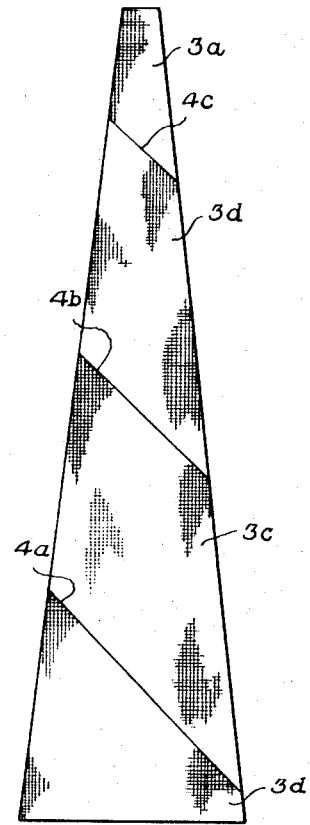
FIG. 4 is a plan view of a gore assembled from the pieces of FIG. 3.

In bias constructions according to FIGS. 3 and 4, also using conventional fabrics in widths up to 1 m maximum, the individual pieces 3a through 3d are cut in such a manner that seams 4a through 4c of the finished gore in FIG. 4 run at a 45° angle to the center line of the gore and parallel to each other.

Figure 5:
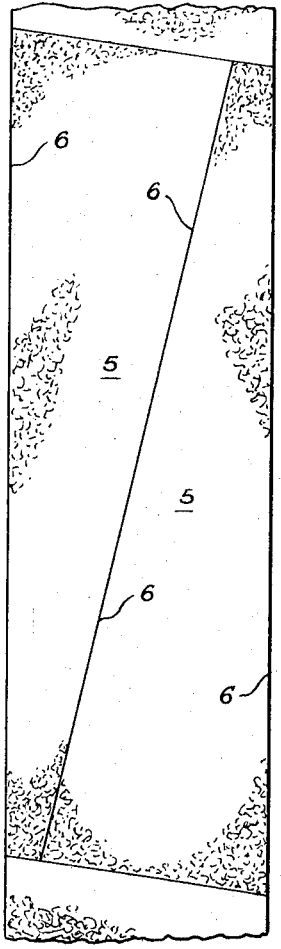
FIG. 5 is a plan view of a sheet of material showing the cutting of single piece gores according to this invention.
Figure 6:
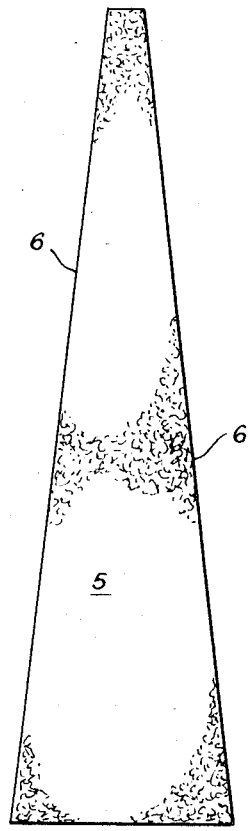
FIG. 6 is a plan view of a single piece gore as cut from the sheet of material in FIG. 5.

In this invention, as shown in FIGS. 5 and 6, using material in widths exceeding 1 m, such as fiber fleece, two continuous undivided gores 5 may be cut from one full material width, with their cutting edges 6 being placed side by side and joined by vertical seams to make up the canopy.

As compared to conventional methods, this invention allows the production of parachute canopies with considerable savings of cost and simplifications in manufacture. Fiber fleece material, which is available in sufficient quantities, enables parachute makers to supply one-way parachutes that are lost after a one-time use for all kinds of purposes; for light and heavy cargo loads, as well as for personnel usage. Use may be found for example in: sea-rescue services, mountain-recovery services, other rescue requirements, sanitary and supply services, fire-fighting equipment supply, and meteorological services.

A decrease of the specific volume may be obtained using fiber fleece material in lightweight construction for the parachute canopy manufacture by eliminating all horizontal seams. Fiber fleece material may also be used in the manufacture of parachute pack assemblies.

Having now described the means by which the objects of this invention are obtained,

I claim:

1. In a cargo and personnel parachute a seamless gore of rolled-out nonwoven and bonded textile fiber fleece material of relatively low strength and extensive elongation and having substantially equal elongation in all directions in response to tension.

2. A cargo and personnel parachute canopy comprising a plurality of seamless gores of rolled-out nonwoven and bonded textile fiber fleece material of relatively low strength and extensive elongation and having substantially equal elongation in all directions in response to tension and means for connecting said gores to form said canopy.

* * * * *